(12) United States Patent
Dupraz

(10) Patent No.: US 10,811,864 B2
(45) Date of Patent: Oct. 20, 2020

(54) DC CIRCUIT BREAKER WITH COUNTER CURRENT GENERATION

(71) Applicant: General Electric Technology GmbH, Baden (CH)

(72) Inventor: Jean-Pierre Dupraz, Bressolles (FR)

(73) Assignee: General Electric Technology GmbH, Baden (CH)

( * ) Notice: Subject to any disclaimer, the term of this patent is extended or adjusted under 35 U.S.C. 154(b) by 172 days.

(21) Appl. No.: 15/546,625

(22) PCT Filed: Jan. 28, 2016

(86) PCT No.: PCT/EP2016/051745
§ 371 (c)(1),
(2) Date: Jul. 26, 2017

(87) PCT Pub. No.: WO2016/120357
PCT Pub. Date: Aug. 4, 2016

(65) Prior Publication Data
US 2018/0019583 A1 Jan. 18, 2018

(30) Foreign Application Priority Data
Jan. 30, 2015 (EP) ..................................... 15153334

(51) Int. Cl.
*H02H 1/04* (2006.01)
*H02H 3/087* (2006.01)
(Continued)

(52) U.S. Cl.
CPC ................ *H02H 1/04* (2013.01); *H01H 9/54* (2013.01); *H01H 9/542* (2013.01); *H02H 3/087* (2013.01);
(Continued)

(58) Field of Classification Search
USPC ...................................................... 361/2–13
See application file for complete search history.

(56) References Cited

U.S. PATENT DOCUMENTS

| 5,517,378 A | 5/1996 | Asplund et al. |
| 8,995,097 B2* | 3/2015 | Skarby ................... H02H 3/087 361/2 |

(Continued)

FOREIGN PATENT DOCUMENTS

| CN | 201877823 U | 6/2011 |
| CN | 103219698 A | 7/2013 |

(Continued)

OTHER PUBLICATIONS

Andersson, D., and Henriksson, A., "Passive and Active DC Breakers in the Three Gorges—Changzhou HVDC Project," International Conference on Power Systems, pp. 1-5 (Sep. 3-5).

(Continued)

*Primary Examiner* — Danny Nguyen
(74) *Attorney, Agent, or Firm* — Eversheds Sutherland (US) LLP

(57) ABSTRACT

A circuit-breaker device, comprising a main branch and an auxiliary branch electrically in parallel with the main branch, wherein the main branch comprises at least one mechanical switch-disconnector in series with a breaker cell constituted of at least one semiconductor switch, and a snubber circuit in parallel with the at least one breaker cell, the snubber circuit including an energy storage element, wherein the mechanical switch-disconnector is switchable to selectively allow current to flow in the main branch in a first mode of operation or commutate current from the main branch to the auxiliary branch in a second mode of operation, characterized in that the snubber circuit further comprises a bleeder resistor arranged to create a counter current (Continued)

in the main branch when current is commutated from the main branch to the auxiliary branch by discharging the energy storage element.

8 Claims, 4 Drawing Sheets

(51) Int. Cl.
*H01H 9/54* (2006.01)
*H02H 3/02* (2006.01)
*H01H 33/59* (2006.01)

(52) U.S. Cl.
CPC .............. *H01H 9/541* (2013.01); *H01H 9/548* (2013.01); *H01H 33/596* (2013.01); *H02H 3/021* (2013.01)

(56) References Cited

U.S. PATENT DOCUMENTS

| | | | |
|---|---|---|---|
| 2013/0009491 A1* | 1/2013 | Hafner | H02M 1/092 307/113 |
| 2014/0313628 A1 | 10/2014 | Hafner et al. | |
| 2015/0002977 A1 | 1/2015 | Dupraz et al. | |
| 2015/0372675 A1* | 12/2015 | Crookes | H03K 17/107 327/436 |
| 2016/0352318 A1* | 12/2016 | Amit | H03K 17/0814 |

FOREIGN PATENT DOCUMENTS

| | | |
|---|---|---|
| CN | 103280763 A | 9/2013 |
| CN | 104137211 A | 11/2014 |
| CN | 104126210 B | 5/2017 |
| DE | 20 2012 100 024 U1 | 4/2012 |
| DE | 20 2012 100 024 U1 | 5/2012 |
| JP | S52-54174 B2 | 4/2013 |
| JP | 2015-507325 A | 3/2015 |
| WO | 2013/071980 A1 | 5/2013 |

OTHER PUBLICATIONS

Wang, Y., and Marquardt, R., "A fast switching, scalable DC-Breaker for meshed HVDC-Super-Grids," Proceedings of International Exhibition and Conference for Power Electronics, Intelligent Motion, Renewable Energy and Energy Management, pp. 1-2 (May 20-22, 2014) (Abstract).
Extended European Search Report and Opinion issued in connection with corresponding EP Application No. 15153334.6 dated Jul. 16, 2015.
International Search Report and Written Opinion issued in connection with corresponding PCT Application No. PCT/EP2016/051745 dated Apr. 22, 2016.
International Preliminary Report on Patentability issued in connection with corresponding PCT Application No. PCT/EP2016/051745 dated Aug. 1, 2017.
Machine Translation and First Office Action and Search issued in connection with corresponding CN Application No. 201680007906.3 dated Jul. 4, 2018.
Communication issued in Japanese Patent Application No. 2017-567914, dated Feb. 28, 2020, with translation, 6 pages.

* cited by examiner

DC CIRCUIT BREAKER WITH COUNTER CURRENT GENERATION

TECHNICAL FIELD

The invention relates to a circuit-breaker device for use in high voltage direct current (HVDC) power transmission.

BACKGROUND OF THE INVENTION

Grid operators increasingly use high voltage direct current (HVDC) to carry high power efficiently over long distances. A prime reason is that for such high power long-distance links, direct current (DC) is superior to alternating current (AC) because it can transmit power without capacitive or inductive losses.

DC converter stations also improve the stability of the associated AC networks by decoupling the frequency and phase of those networks. HVDC links are therefore very useful in stabilizing grids which are challenged by a growing contribution of power from distributed and intermittent sources such as wind or solar energy.

A key element in power networks is the circuit breaker. Its role is to protect the network, preventing failures and blackouts by rapidly cutting the current in a malfunctioning element (following a lightning strike, or the breakage of an undersea cable, for example). In this way it isolates the fault from the rest of the grid. Circuit breakers are vital to protect complex interconnected grids, be they AC or DC.

In AC networks, the current is periodically driven through zero (100 times a second for a 50 Hz network), and current zero is the ideal instant to interrupt.

But in DC networks, there is no natural current zero and one major technical challenge is fault current that does not stop rising.

In the absence of current zero, electrical arcs are created between contacts which are separated by switches of the circuit breaker. This can erode and degrade the contacts, thereby adversely affecting the dielectric withstand and reducing the lifetime of the switches.

The DC breaker with elements that are able to create an artificial current zero has therefore been developed.

As shown on FIG. 1, and for instance described in the article from Dag Andersson Dr. and Anders Henriksson, "Passive and Active DC Breakers in the Three Gorges—Changzhou HVDC Project" (Cigré International Conference on Power Systems, Wuhan, China, 3-5 September, 2001, Page 391), such artificial current zero can be achieved by adding an LC oscillating circuit in parallel to a circuit breaker B. Here the LC circuit comprises a series arrangement of an inductor L, an interrupter I and a capacitor C which is permanently pre-charged.

The DC breaker of FIG. 1 comprises three branches in parallel: a low-impedance branch with the breaker B (main branch) where current flows in steady state, an auxiliary branch with the LC circuit and an energy absorber branch with a surge arrester P.

The switching scenario is a two-step process.

Step 1: In the closed position of the breaker B, the current flows through the main branch, the auxiliary and energy absorber branches playing no role. On a trip order, to initiate current commutation from the main branch to the auxiliary branch, the breaker's contacts are separated while current still flows through the main branch. An arc of increasing length is thereby drawn between the breaker's contacts. When the contacts are sufficiently separated, the interrupter I of the auxiliary branch is closed. The pre-charged capacitor C discharges through the inductor L and the breaker B with a frequency imposed by the capacitance and inductance of this oscillating circuit. If the voltage of the capacitor is high enough, the discharge current exceeds the DC current, current crosses zero and the current in the main branch is interrupted in less than one period. Otherwise the discharge initiates current oscillations in the loop formed by the main and auxiliary branches. The oscillating current increases and finally exceeds the DC current that is to be interrupted. Now the current flowing through the main branch has zero crossings and the breaker can interrupt the current.

Step 2. When the arc current is interrupted, current now only flows in the auxiliary branch. The energy in the line (or cable) is still too high, and it continues charging up the capacitor. When the knee point voltage of the surge arrester is reached, it starts conducting, absorbs energy and clamps the voltage. This voltage opposes the current flow through the circuit breaker until the line has no more energy which corresponds to a zero current. Voltage drops to the knee point voltage of the surge arrester and current is definitely interrupted.

Another example of a DC breaker with artificial current zero creation by means of a LC circuit is shown on FIG. 2 and described in the article from Yeqi Wang and Rainer Marquardt, «A fast switching, scalable DC-Breaker for meshed HVDC-Super-Grids», PCIM-Europe, 20-22 May 2014.

In the closed position of the two breakers $B_{in}$, $B_{out}$ on the main branch, the capacitor $C_{PG}$ is charged to the network voltage. When this circuit breaker is set to interrupt, a mechanism opens the breakers Bin and Bout, thereby creating an electric arc in both breakers. When the contact separation is large enough to ensure voltage stability, the thyristor $T_{PG}$ is closed and initiates a current in the loop formed by the capacitor $C_{PG}$ (precharged) and the inductor $L_{PG}$. When the current tries to reverse (i.e. after a half period), thyristors turn off naturally without the need for a turn-off command. After thyristors blocking, the capacitor $C_{PG}$ ends up with roughly the same charge, but the voltage is reversed. A second current oscillation is then initiated between the capacitor $C_{PG}$ and inductances $L_{in}$ and $L_{out}$ external to the circuit breaker. The high inrush current of the part of the network on the left and right of the circuit breaker towards the capacitor $C_{PG}$ creates a zero current in the breaker which is on the side of the fault. In case the inrush current was much higher than the current flowing at the instant of switching, diodes $D_{in}$, $D_{out}$ in parallel with the breakers allow current to flow without re-ignition of the arc and branches labeled DB close the circuit to keep the loop inductance low and the inrush current high. If the network inductances $L_{in}$, $L_{out}$ still have magnetic energy, it can be dissipated in the surge arrester $VDR_{PG}$. The current is reduced to zero and the fault is isolated.

These prior art solutions have the disadvantage of creating a countercurrent which is higher than the current to be cut. Indeed, countercurrent values must exceed the magnitude of kilo amperes for the circuit breaker of FIG. 1 and ten kilo amperes for the circuit breaker of FIG. 2. Due to the inductance in the loop in which the current must flow, a certain amount of energy has to be stored which necessitate capacitors of large volume. Such capacitors are especially onerous in that they must be mounted insulated from earth and isolated from each other in the second prior art.

SUMMARY OF THE INVENTION

An embodiment of the invention aims at accelerating arc extinction in a HVDC circuit breaker while overcoming the disadvantage of the prior art solutions. To this purpose, an embodiment of the invention proposes a circuit breaker device comprising a main branch and an auxiliary branch electrically in parallel with the main branch, wherein the main branch comprises at least one mechanical switch-disconnector in series with a breaker cell constituted of at least one semiconductor switch, and a snubber circuit in parallel with the at least one breaker cell, the snubber circuit including an energy storage element, wherein the mechanical switch-disconnector is switchable to selectively allow current to flow in the main branch in a first mode of operation or commutate current from the main branch to the auxiliary branch in a second mode of operation, characterized in that the snubber circuit further comprises a bleeder resistor arranged to create a counter current in the main branch when current is commutated from the main branch to the auxiliary branch by discharging the energy storage element.

Certain not limiting features of this circuit breaker device are as follows: the snubber circuit comprises a diode connected in series with the energy storage element, the bleeder resistor being arranged in parallel with the diode; it further comprises a surge arrester in parallel with the at least one breaker cell; the auxiliary branch further comprises at least one thyristor in series with a switching-assistance module constituted by the parallel connection of a capacitor, a resistor, and a surge arrester.

An embodiment of the invention further relates to a power system including a transmission line arranged to carry direct current and a circuit-breaker device according to an embodiment of the invention coupled to the transmission line to controllably effecting discontinuation of flow of direct current in the transmission line. The power system may include a High Voltage Direct Current power transmission system.

BRIEF DESCRIPTION OF THE DRAWINGS

Other aspects, goals, advantages and features of the invention will appear more clearly on reading the following detailed description of embodiments thereof, given by way of non-limiting example and with reference to the accompanying drawing in which:

FIGS. 2A, 2 B, and -2C illustrate operating modes of another prior art circuit breaker device;

DETAILED DESCRIPTION OF THE INVENTION

Figure 1:
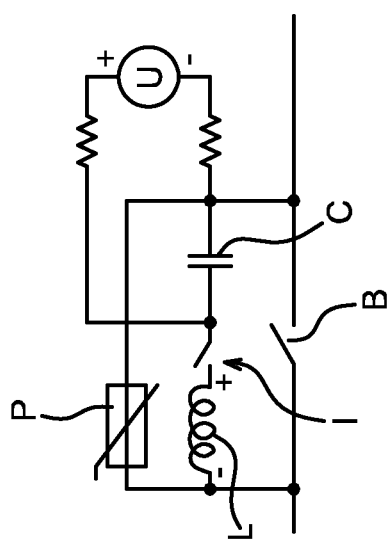
FIGS. 1 and 2, already discussed above, show circuit breaker devices of the prior art.
Figure 2:
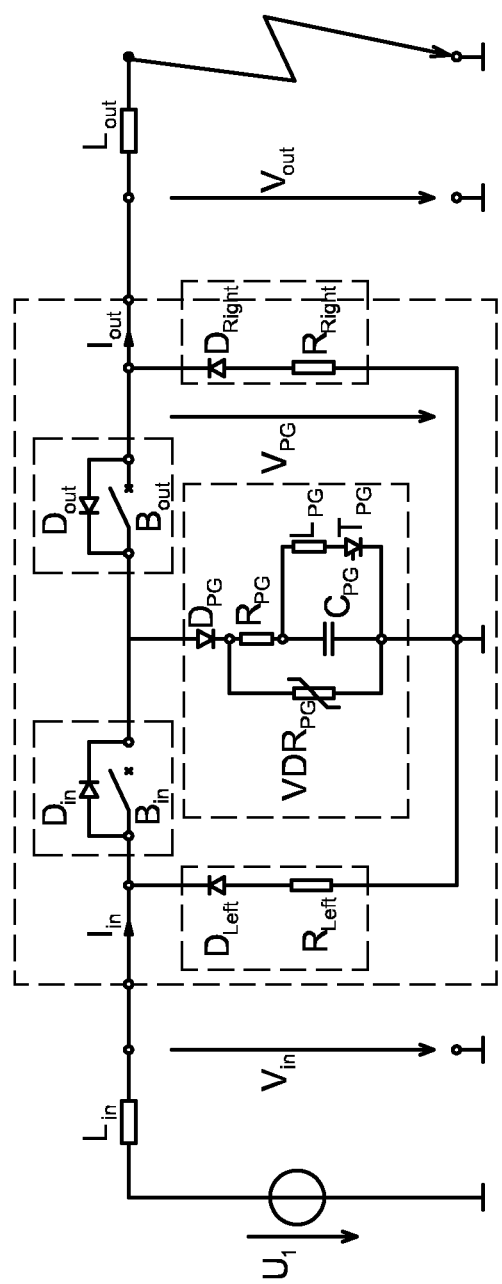
Figure 2A:
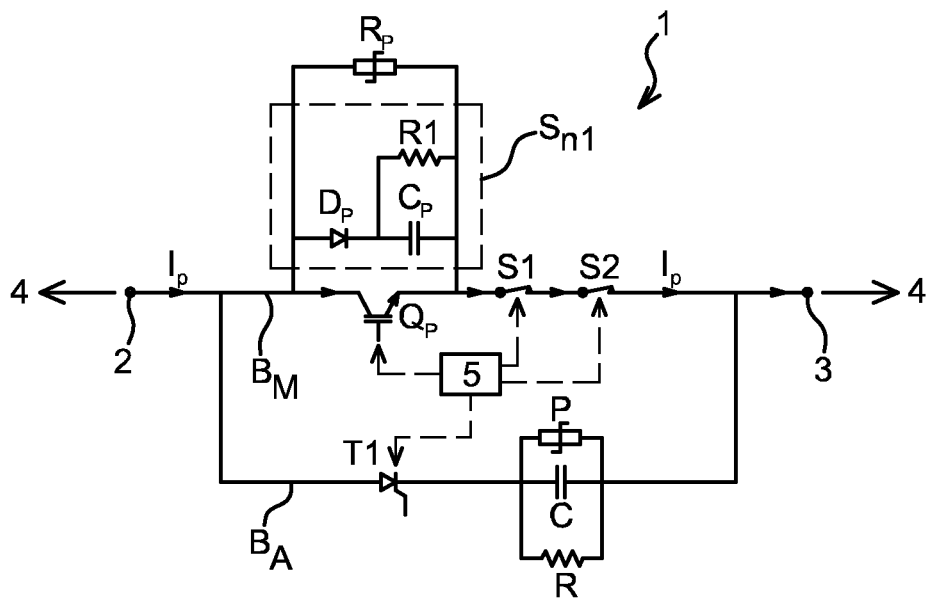
Figure 2B:
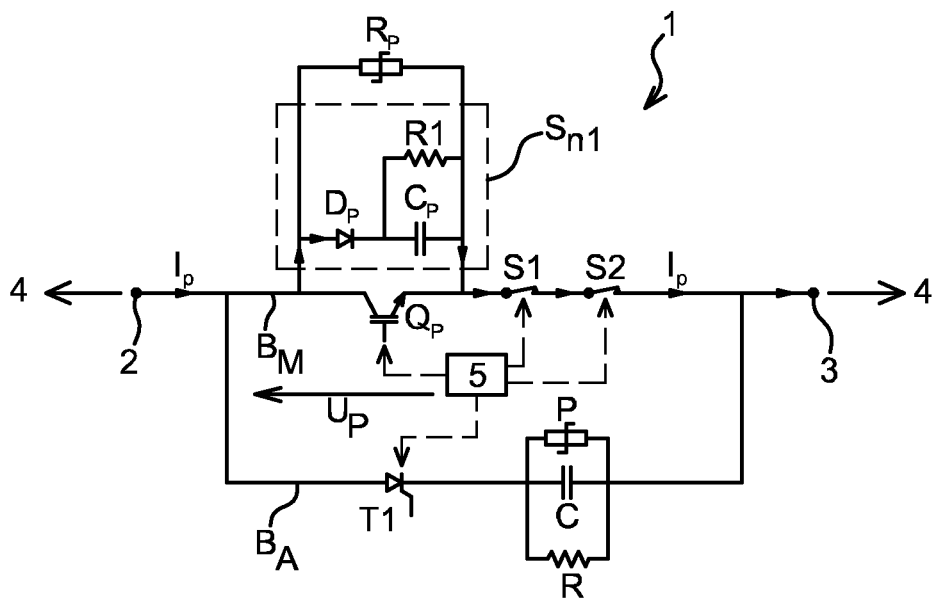
Figure 2C:
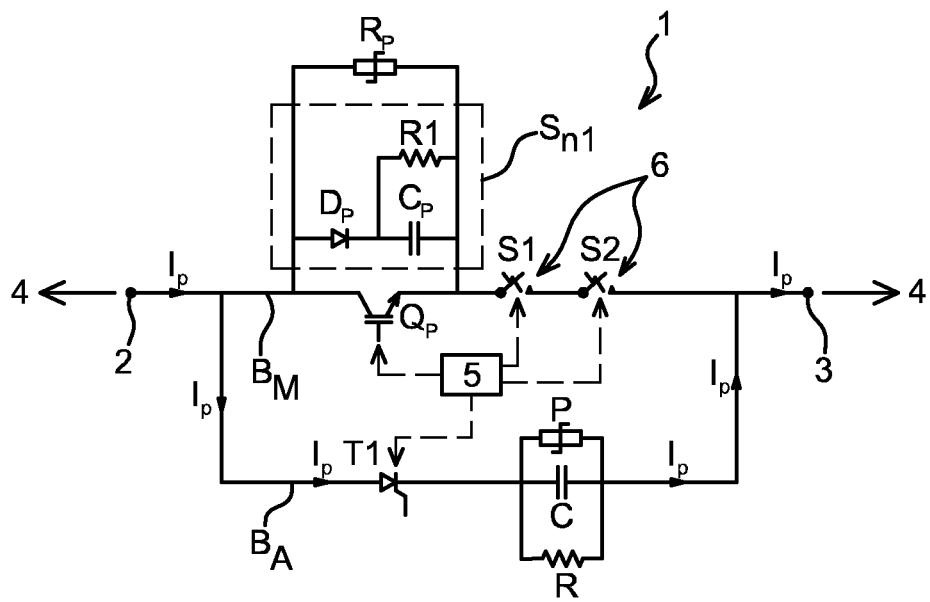
Figure 3A:
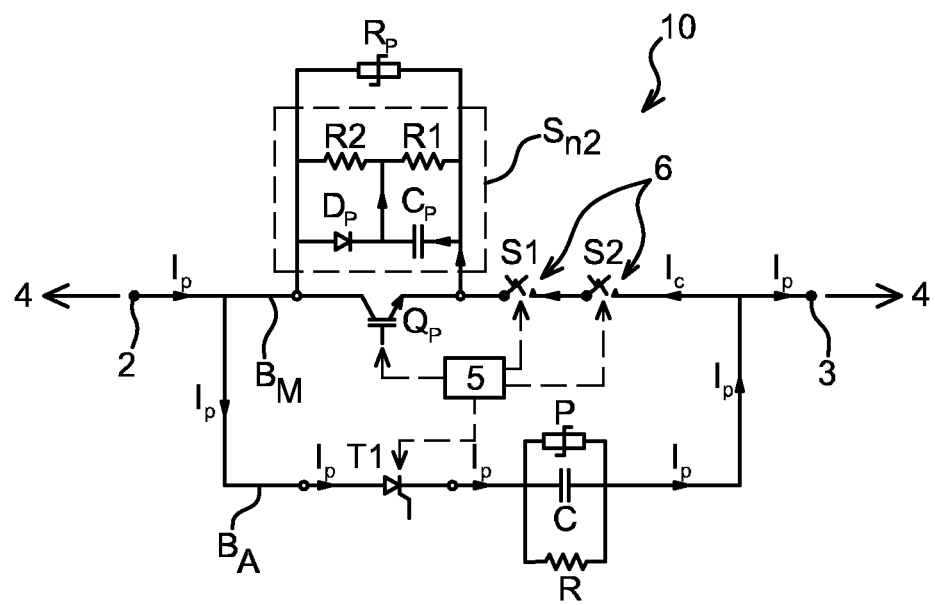
FIG. 3A shows a circuit breaker device.

FIGS. 2A-2C illustrate operating modes of a prior art circuit breaker device 1 with no countercurrent generation for accelerating arc extinction. FIG. 3A shows a circuit breaker device 10 according to a possible embodiment of the invention. As will be apparent from the below description, the circuit breaker device 10 has the same topology as the prior art circuit breaker 1 but with an additional bleeder resistor that allows creating a counter current. For this reason, common elements in the circuit breaker devices 1 and 10 share the same references.

The circuit breaker devices 1, 10 are each adapted to be coupled to a transmission line of a power system, arranged to carry direct current, for controllably effecting discontinuation of flow of direct current in the transmission line. The power system may comprise a High Voltage Direct Current power transmission system.

Each of the circuit breaker devices 1, 10 comprises a main branch $B_M$ in which, in use, the current flows under steady conditions and an auxiliary branch $B_A$ electrically in parallel with the main branch. Each of the main and auxiliary branches $B_M$, $B_A$ extend between a first and a second terminal 2, 3 which, in use, are connected to a DC electrical network 4.

The main branch $B_M$ comprises at least one mechanical switch-disconnector S1, S2 in series with at least one breaker cell constituted by at least one semiconductor switch $Q_P$. The at least one mechanical switch-disconnector S1, S2 is for instance a vacuum interrupter. Each semiconductor switch $Q_P$ can, for example, be a silicon-based insulated gate bipolar transistor (IGBT). Alternatively, other types of turn-off semiconductor device such as a JFET, MOSFET or bipolar transistor can be used, as could other wide-band-gap semiconductor materials such as silicon carbide or gallium nitride.

The circuit breaker devices 1, 10 further comprise a switching control unit 5 to control switching of the at least one mechanical switch-disconnector S1, S2 and of the at least one semiconductor switch $Q_P$.

Hence, by means of the switching control unit 5, the at least one mechanical switch-disconnector S1, S2 is switchable to selectively allow current to flow in the main branch $B_M$ in a first mode of operation or commutate current from the main branch to the auxiliary branch $B_A$ in a second mode of operation.

The main branch $B_M$ further comprises a snubber circuit Sn1, Sn2 in parallel with the at least one breaker cell $Q_P$. The snubber circuit includes a diode $D_P$ electrically in series with an energy storage element such as a capacitor $C_P$, itself electrically in parallel with a discharge resistor R1.

The energy storage element $C_P$ controls the rate of increase of the voltage at its terminals when the breaker cell $Q_P$ is switched to the OFF state by the switching control unit 5. The diode $D_P$ prevents violent discharging of the capacitor $C_P$ when the breaker cell $Q_P$ begins to conduct. Finally, the discharge resistor R1 enables slow discharging of the energy storage element $C_P$.

Hence, the snubber circuit protects the breaker cell to which it is associated by controlling the rate at which the voltage across its terminals increases when it switches from the conducting (ON) state to the non-conducting (OFF) state. This limitation of the rate of voltage increase also has a beneficial effect for switching the current from the main branch to the auxiliary branch, in the sense that it contributes to controlling the di/dt of the current in said branch.

Also electrically in parallel with the breaker cell $Q_P$ is a surge arrester $R_P$. It is designed to limit the voltage to a value less than the withstand voltage of the breaker cell $Q_P$.

The auxiliary branch $B_A$ is provided in parallel with the main branch $B_M$ and comprises at least one thyristor T1 in series with a switching-assistance module constituted by the parallel connection of a capacitor C, a resistor R to discharge the capacitor, and a surge arrester P. The switching control module 5 is further configured to switch the at least one thyristor T1 between its non-conducting (OFF) state and its conducting (ON) state.

When the circuit breaker devices 1, 10 switch from the main into the auxiliary branch, the surge arresters RP, P are used one after the other in both branches.

FIG. 2a illustrates the first mode of operation with current $I_P$ flowing in the main branch $B_M$.

Upon appearance of an electrical fault on the network 4, current $I_P$ increases in the main branch $B_M$. In order to eliminate this fault, current has to be interrupted. Current interruption is performed with the switching control unit 5 implementing the following sequence of operations.

As shown on FIG. 2B, first the at least one breaker cell $Q_P$ in the main branch $B_M$ is switched off and the current is diverted to the snubber circuit Sn1. The snubber circuit Sn1 limits the rate of rise of voltage and charges its energy storage element $C_P$ until the parallel surge arrester $R_P$ conducts.

In a second step, as shown on FIG. 2C, the at least one thyristor T1 in the auxiliary branch $B_A$ is switched to its conducting state. Simultaneously, opening of the at least one mechanical switch-disconnector S1, S2 in the main branch is started.

Figure 2D:
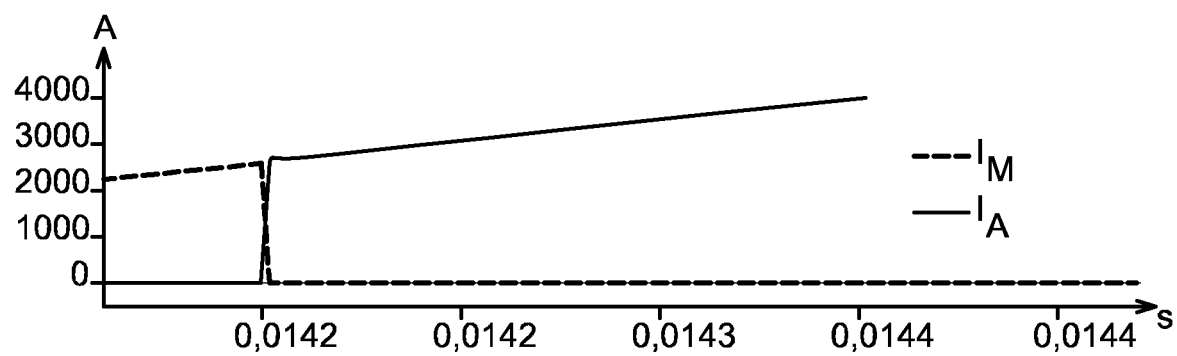
FIG. 2D shows the current commutation from the main branch to the auxiliary branch of the prior art circuit breaker device of FIGS. 2A-2C.

The current is therefore diverted to the auxiliary branch $B_A$. FIG. 2D shows this current commutation from the main branch to the auxiliary branch, with $I_M$ designating the current value in the main branch over time and $I_A$ designating the current value in the auxiliary branch over time.

Following this commutation, the capacitor C in the auxiliary branch $B_A$ gets charged until the parallel surge arrester P conducts. This last surge arrester P limits the voltage to a smaller value than the first surge arrester $R_P$. The energy storage element $C_P$ of the snubber circuit Sn1 discharges slowly through the parallel discharge resistor R1. Depending on the voltage difference and technology used (highly non-linear transient voltage suppressor versus non-linear surge arrester) a current still passes in the same direction as before the second step through the at least one mechanical switch-disconnector S1, S2 in the main branch $B_M$ of the prior art circuit breaker device 1, and an electrical arc 6 is created.

In order to establish a current zero in the branch and ensure that the arc extinguishes, an embodiment of the invention makes use of the charges stored in the energy storage element $C_P$ of the snubber circuit to generate a counter current in the main branch. As shown on FIG. 3a which represents the circuit breaker device 10 according to an embodiment of the invention, the snubber circuit Sn2 further comprises a bleeder resistor R2 arranged to create a counter current Ic in the main branch $B_M$ when current is commutated from the main branch to the auxiliary branch by discharging the energy storage element Cp.

Upon complete discharge of the energy storage element Cp, the counter current gets stabilized at zero.

As shown on FIG. 3a, the bleeder resistor R2 may be arranged in parallel with the diode $D_P$ of the snubber circuit Sn2.

The bleeder resistor R2 may be identical to the discharge resistor R1, but can be chosen smaller to adjust the counter current Ic.

Figure 3B:
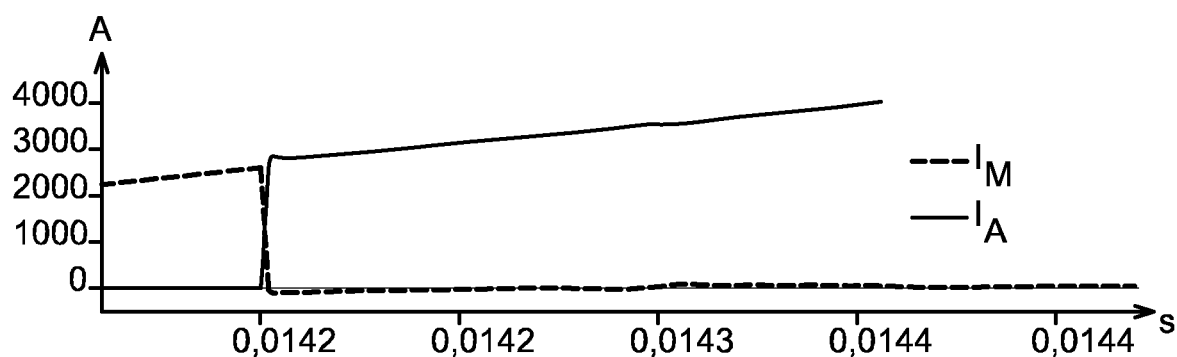
FIG. 3B shows the current commutation from the main branch to the auxiliary branch of the circuit breaker of FIG. 3A.

The effect of adding the bleeder resistor R2 on the current in the at least one mechanical switch-disconnector S1, S2 can be seen on FIG. 3B which represents the current value $I_M$ in the main branch over time and the current value $I_A$ in the auxiliary branch over time. A peak of negative current is observed, of a few tens of amperes but of very low duration (less than a millisecond), which correspond to the counter current Ic created in the main branch $B_M$. This counter current Ic is of very low value compared to the current to be interrupted, but of sufficient value to create the zero crossing and accelerate extinction of the arc. Lifetime of the contacts of the at least one mechanical switch-disconnector is therefore improved, while the counter-current only necessitates small capacitors to be generated.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A circuit-breaker device, comprising
a main branch and an auxiliary branch electrically in parallel with the main branch, wherein the main branch comprises at least one mechanical switch-disconnector in series with a breaker cell constituted of at least one semiconductor switch; and
a snubber circuit in parallel with the at least one breaker cell, the snubber circuit including an energy storage element, wherein the mechanical switch-disconnector is switchable to selectively allow current to flow in the main branch in a first mode of operation or commutate current from the main branch to the auxiliary branch in a second mode of operation,
wherein the snubber circuit further comprises a bleeder resistor arranged to create a counter current in the main branch while current is commutated from the main branch to the auxiliary branch by discharging the energy storage element.

2. The circuit-breaker device of claim 1, wherein the snubber circuit comprises a diode connected in series with the energy storage element, the bleeder resistor being arranged in parallel with the diode.

3. The circuit-breaker of claim 1, further comprising a surge arrester in parallel with the at least one breaker cell.

4. The circuit-breaker of claim 1, wherein the auxiliary branch further comprises at least one thyristor in series with a switching-assistance module constituted by a parallel connection of a capacitor, a resistor, and a surge arrester.

5. A power system comprising:
a transmission line arranged to carry direct current; and
a circuit-breaker device comprising:
a main branch and an auxiliary branch electrically in parallel with the main branch, wherein the main branch comprises at least one mechanical switch-disconnector in series with a breaker cell constituted of at least one semiconductor switch; and
a snubber circuit in parallel with the at least one breaker cell, the snubber circuit including an energy storage element, wherein the mechanical switch-disconnector is switchable to selectively allow current to flow in the main branch in a first mode of operation or commutate current from the main branch to the auxiliary branch in a second mode of operation,
wherein the snubber circuit further comprises a bleeder resistor arranged to create a counter current in the main branch while current is commutated from the main branch to the auxiliary branch by discharging the energy storage element coupled to the transmission line to controllably effect discontinuation of flow of direct current in the transmission line.

6. The power system of claim 5, comprising a High Voltage Direct Current power transmission system.

7. The circuit-breaker device of claim 1, wherein the counter current created by the bleed resistor is lower than a current to be interrupted.

8. The circuit-breaker device of claim 1, wherein the mechanical switch-disconnector is configured to switch at zero current.

* * * * *